(12) United States Patent
Barron et al.

(10) Patent No.: US 7,812,903 B2
(45) Date of Patent: Oct. 12, 2010

(54) LIQUID CRYSTAL DISPLAY ENHANCED IN PARTICULAR BY ELIMINATION OF HARMFUL EFFECTS ON THE EDGES OF ADDRESSED ZONES

(75) Inventors: Cécile Barron, Paris (FR); Sébastien Perny, Paris (FR); Lorenzo Bajic, Houdan (FR); Ivan Dozov, Gif sur Yvette (FR)

(73) Assignee: Nemoptic, Magny-les-Hameaux (FR)

( * ) Notice: Subject to any disclaimer, the term of this patent is extended or adjusted under 35 U.S.C. 154(b) by 367 days.

(21) Appl. No.: 11/660,342

(22) PCT Filed: Aug. 11, 2005

(86) PCT No.: PCT/FR2005/002076
§ 371 (c)(1),
(2), (4) Date: Sep. 10, 2007

(87) PCT Pub. No.: WO2006/021681
PCT Pub. Date: Mar. 2, 2006

(65) Prior Publication Data
US 2008/0303992 A1 Dec. 11, 2008

(30) Foreign Application Priority Data
Aug. 17, 2004 (FR) .................................. 0408920

(51) Int. Cl.
*G02F 1/1333* (2006.01)
(52) U.S. Cl. ...................... 349/110; 349/139
(58) Field of Classification Search ............... 385/37, 385/48, 135, 17, 22, 24, 28; 359/15, 17, 359/18, 558, 566, 573; 349/110, 139; 369/103
See application file for complete search history.

(56) References Cited

U.S. PATENT DOCUMENTS

| | | | |
|---|---|---|---|
| 5,132,816 A * | 7/1992 | Itoh et al. | 349/111 |
| 6,714,271 B1 * | 3/2004 | Matsuyama et al. | 349/123 |
| 2003/0184703 A1 * | 10/2003 | Greene et al. | 349/158 |
| 2004/0125294 A1 * | 7/2004 | Angele et al. | 349/123 |
| 2007/0195237 A1 * | 8/2007 | Kubo et al. | 349/114 |
| 2008/0297714 A1 * | 12/2008 | Yanagawa et al. | 349/153 |

* cited by examiner

*Primary Examiner*—Ellen Kim
(74) *Attorney, Agent, or Firm*—Blakely, Sokoloff, Taylor & Zafman

(57) ABSTRACT

The invention concerns a liquid crystal display device comprising two substrates (10, 20) provided with respective electrodes (12, 22) and located on either side of a layer of liquid crystal molecules (30) and means defining two stable states for the liquid crystal molecules, in the absence of an electric field. The invention is characterized in that it further comprises a mask (100) including transparent areas (130) allowing through only the design of the areas to be visualized and opaque areas (110) covering the rest of the surface of the display and among others the zones not addressed by the electrodes (12, 22) and, in that the electrodes (12, 22) are configured such that their edges are located in zones outside the transparent areas (120) of the mask (100), in that each electrode block (28) consists of the assembly of interconnected elementary areas through multiplexing and of intermediate zones located beneath the opaque areas (110) of the mask (100), and that on at least one of the substrates (10, 20), the electrodes are formed of blocks (28) which cover the entire surface of the substrate except the intermediate zones (281) of small width required for providing electrical insulation between the blocks.

23 Claims, 14 Drawing Sheets

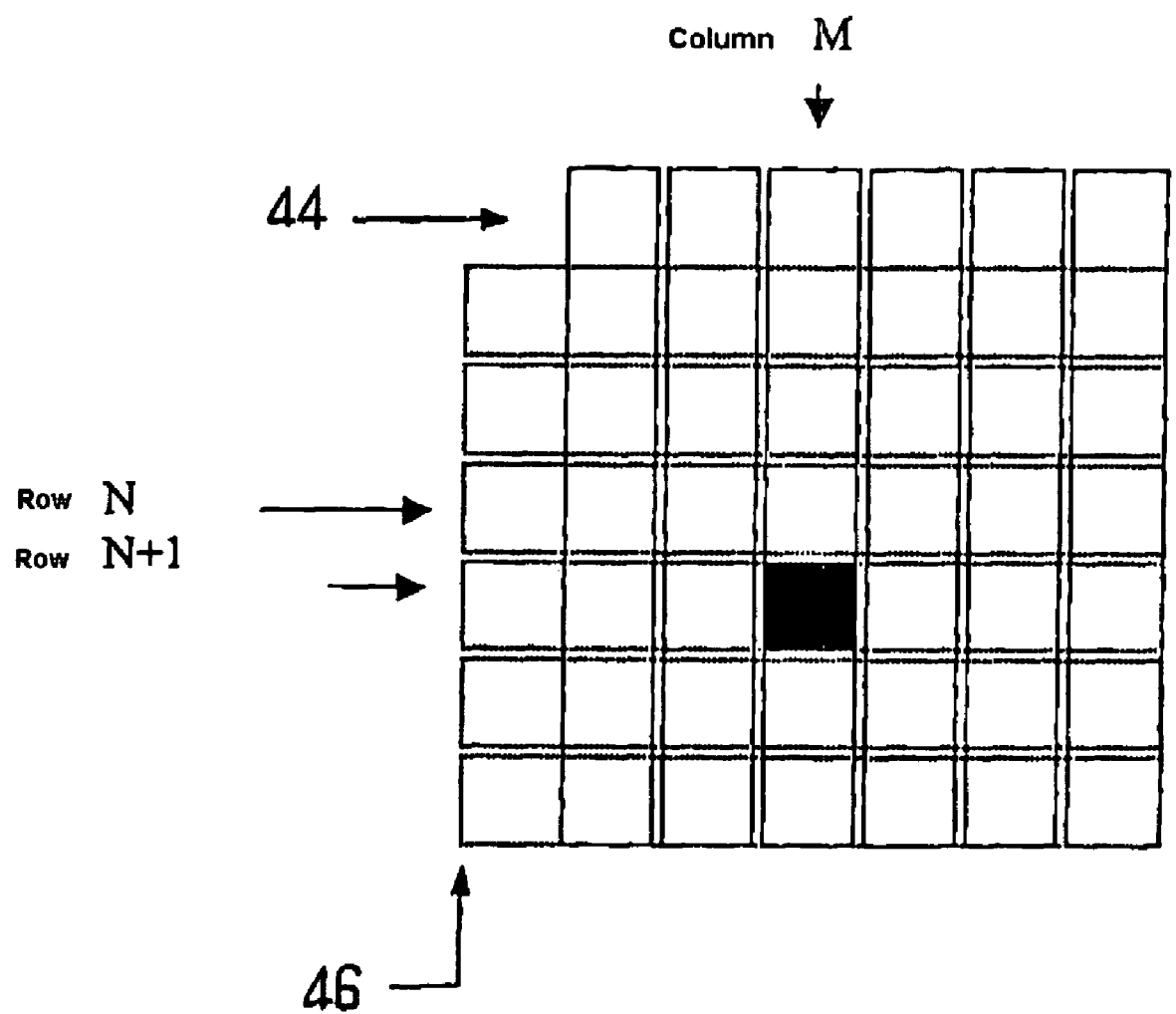

FIG_4
4a
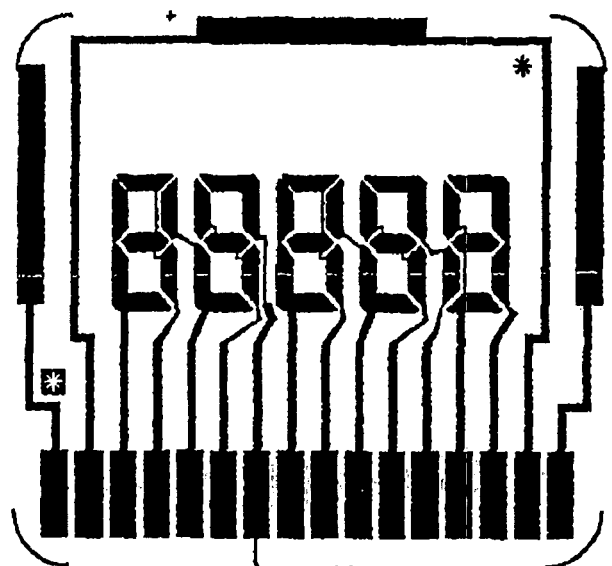
P10
4b
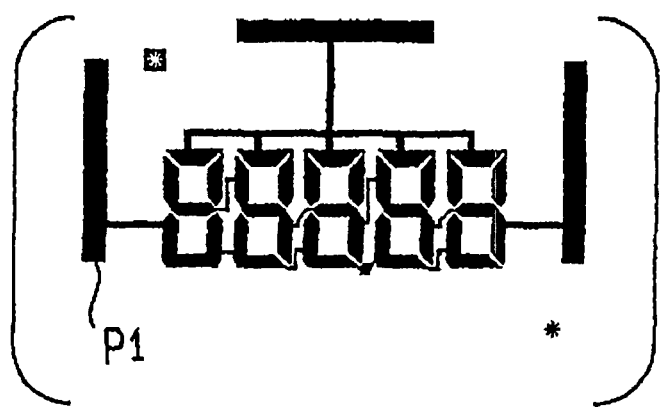
P1
4c
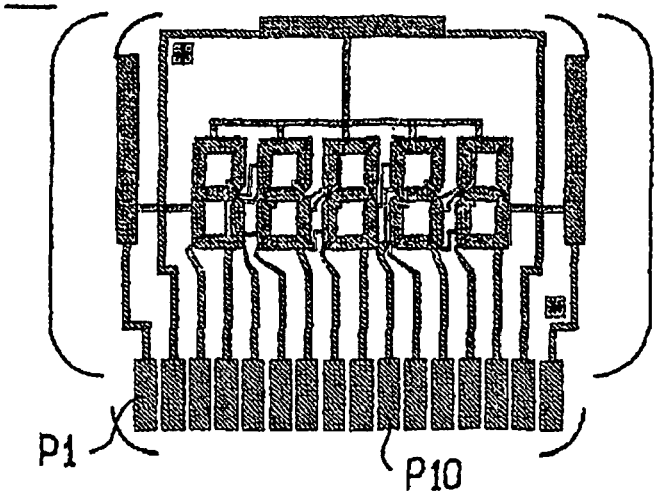
P1   P10

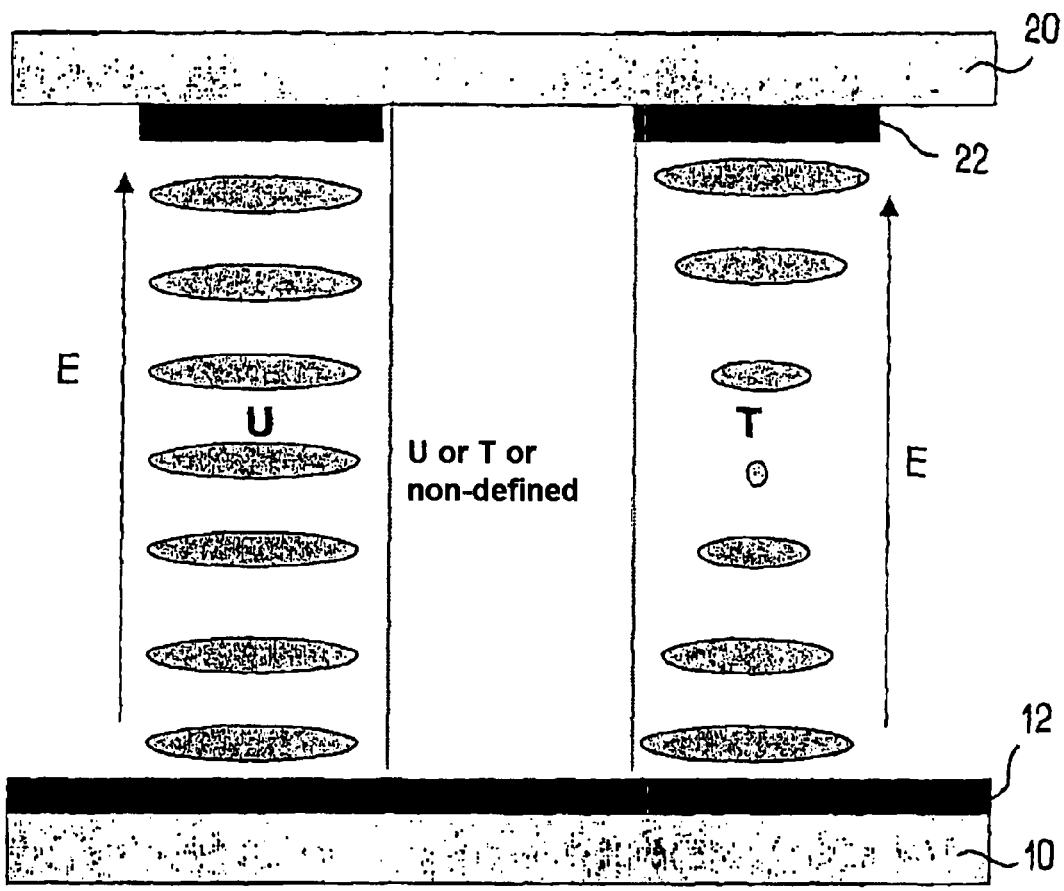
FIG_6
FIG_7

FIG.8
FIG.8a
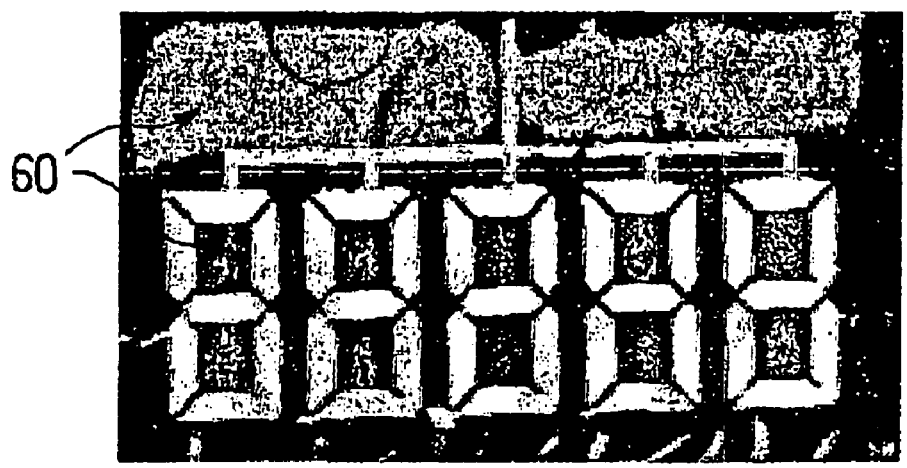
FIG.8b
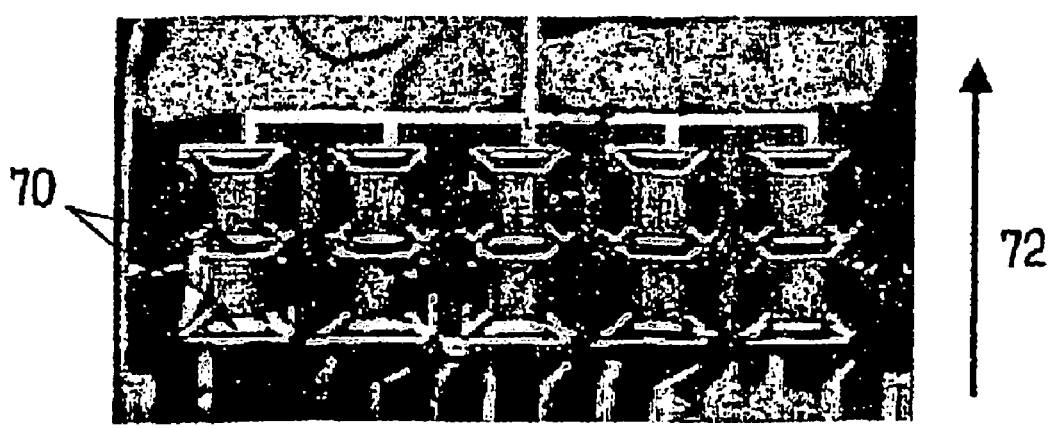

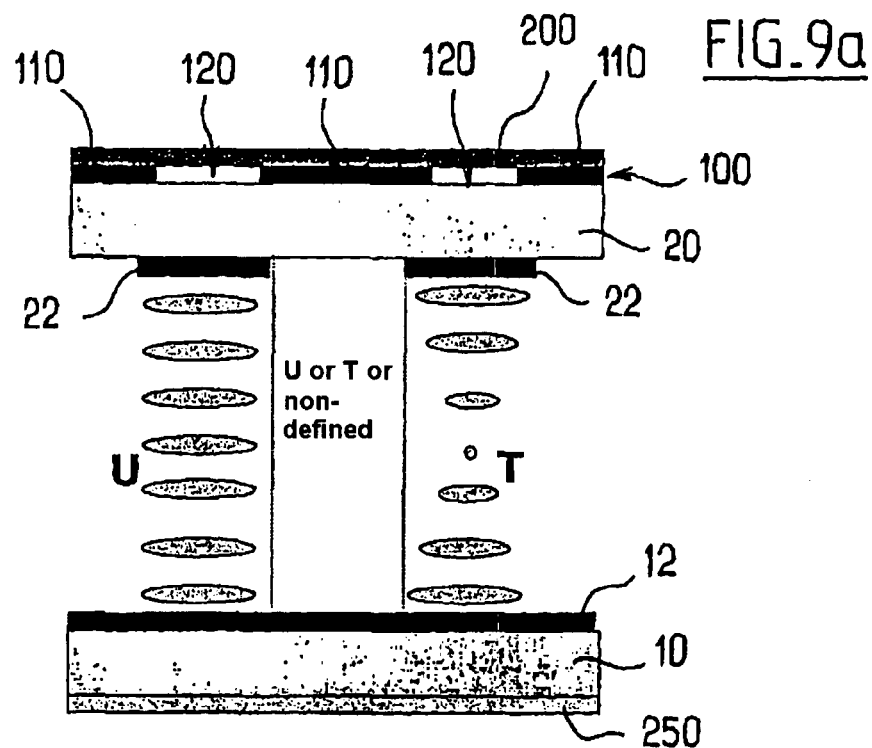
FIG_9
FIG_9a
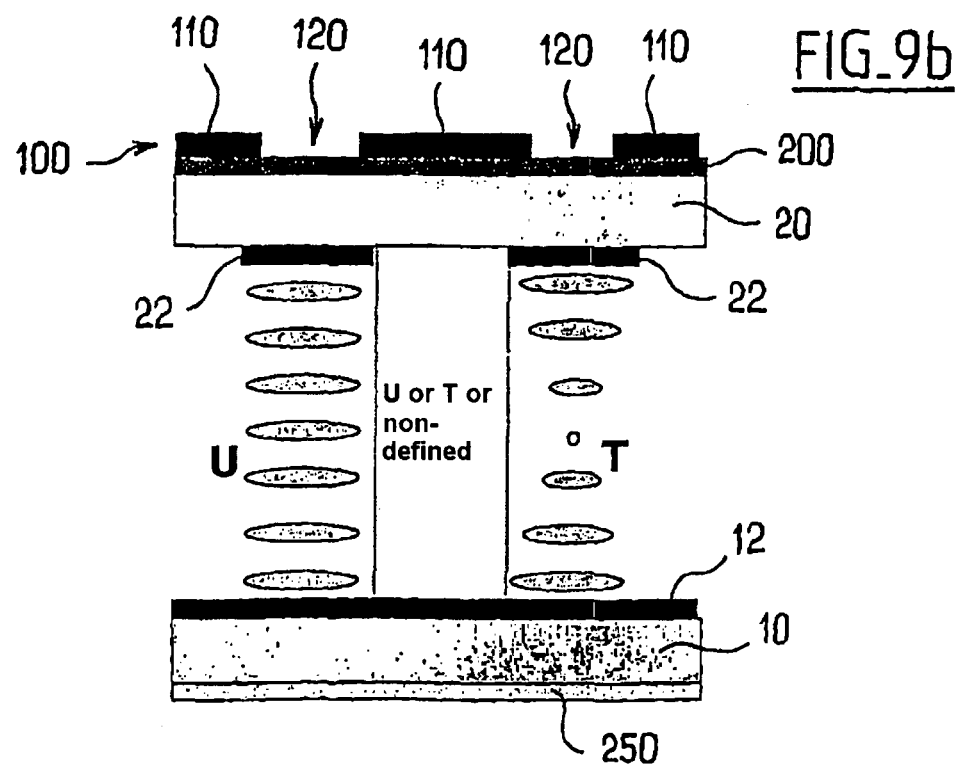
FIG_9b

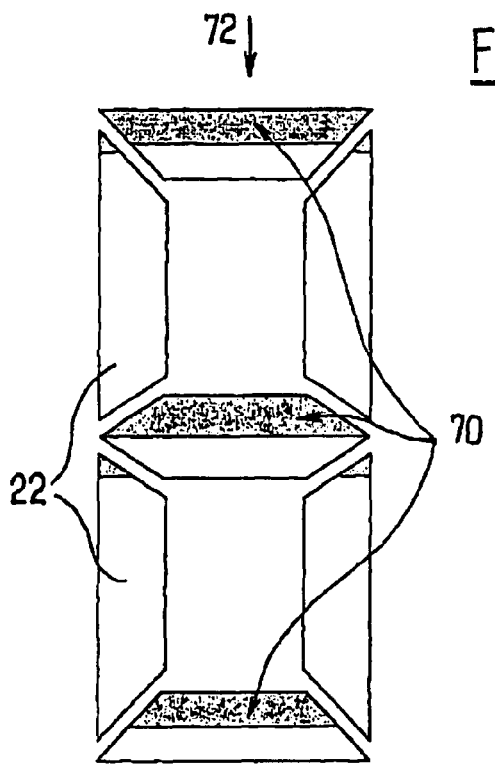
FIG._10
FIG._10a
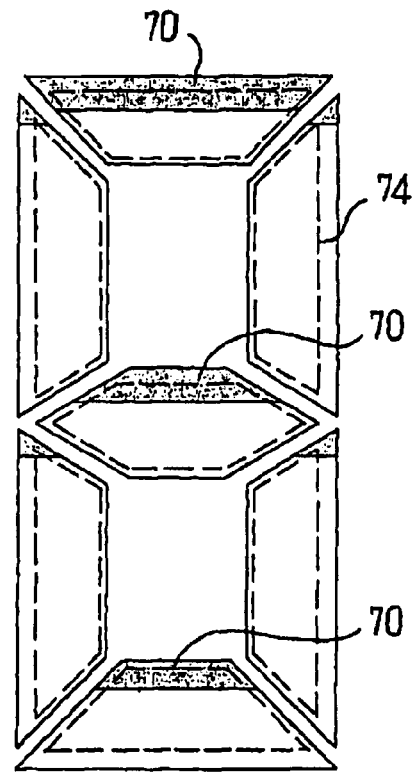
FIG._10b
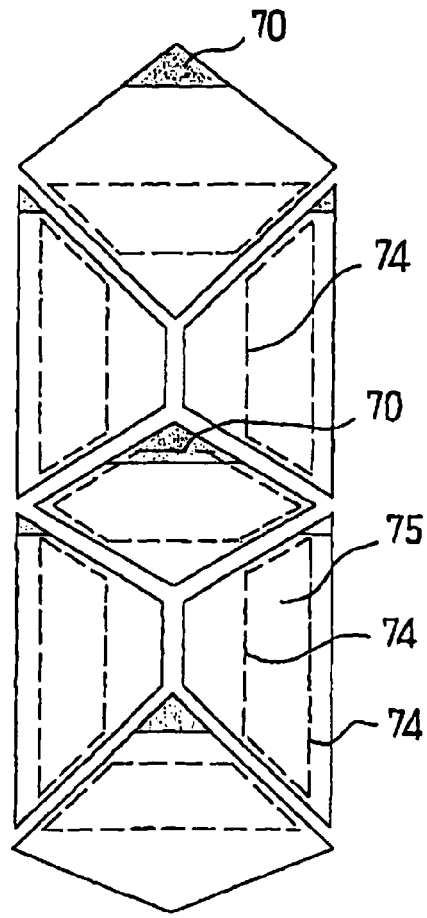
FIG._11

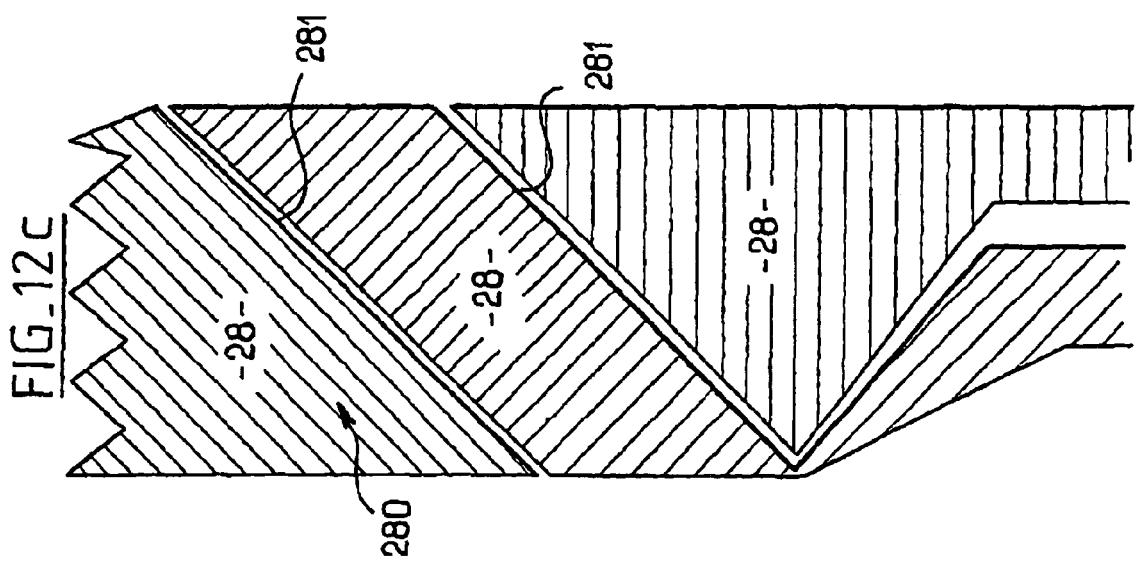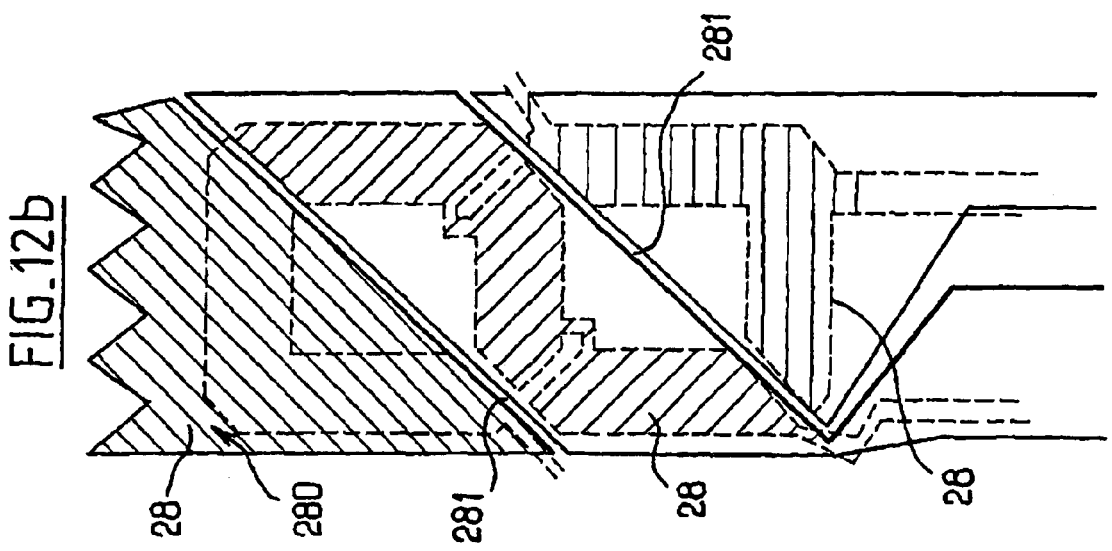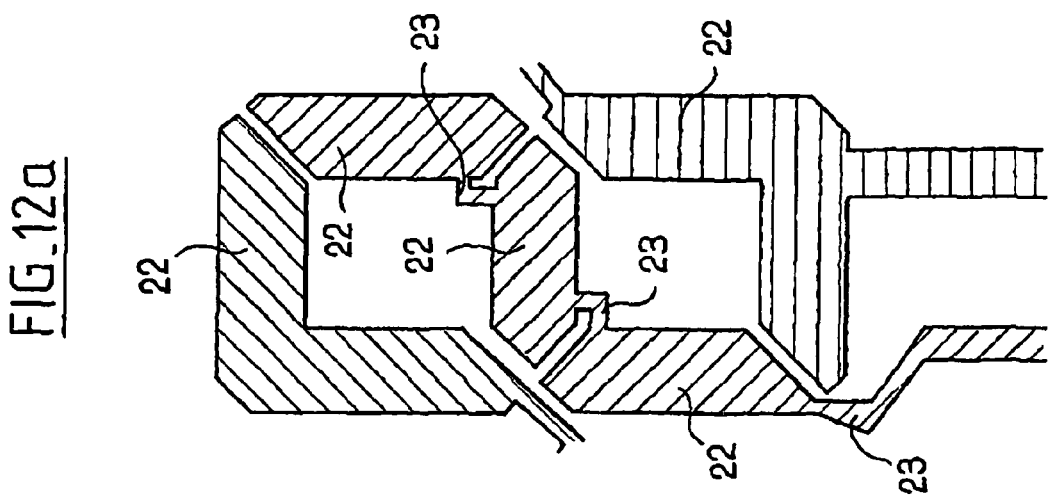

FIG_14a
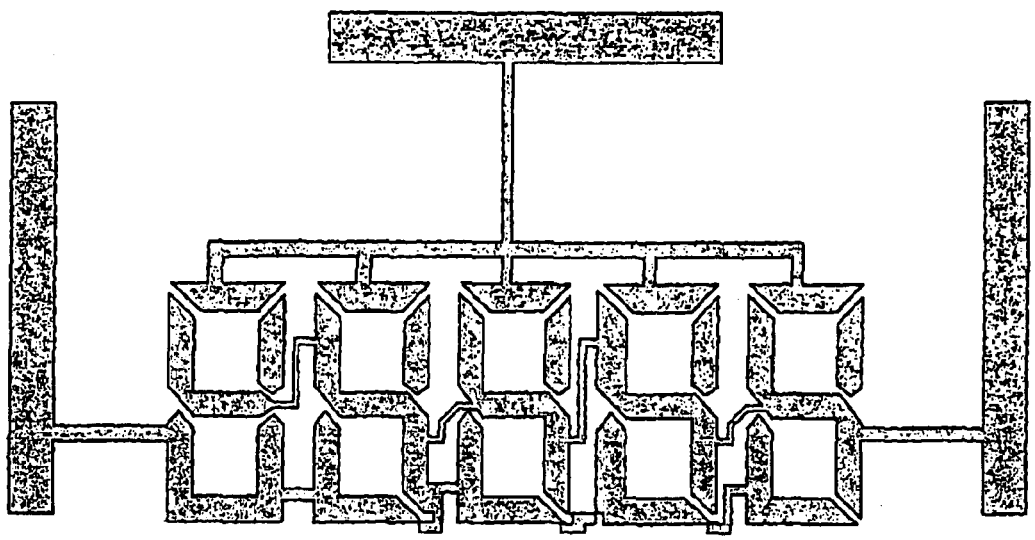
FIG_14b
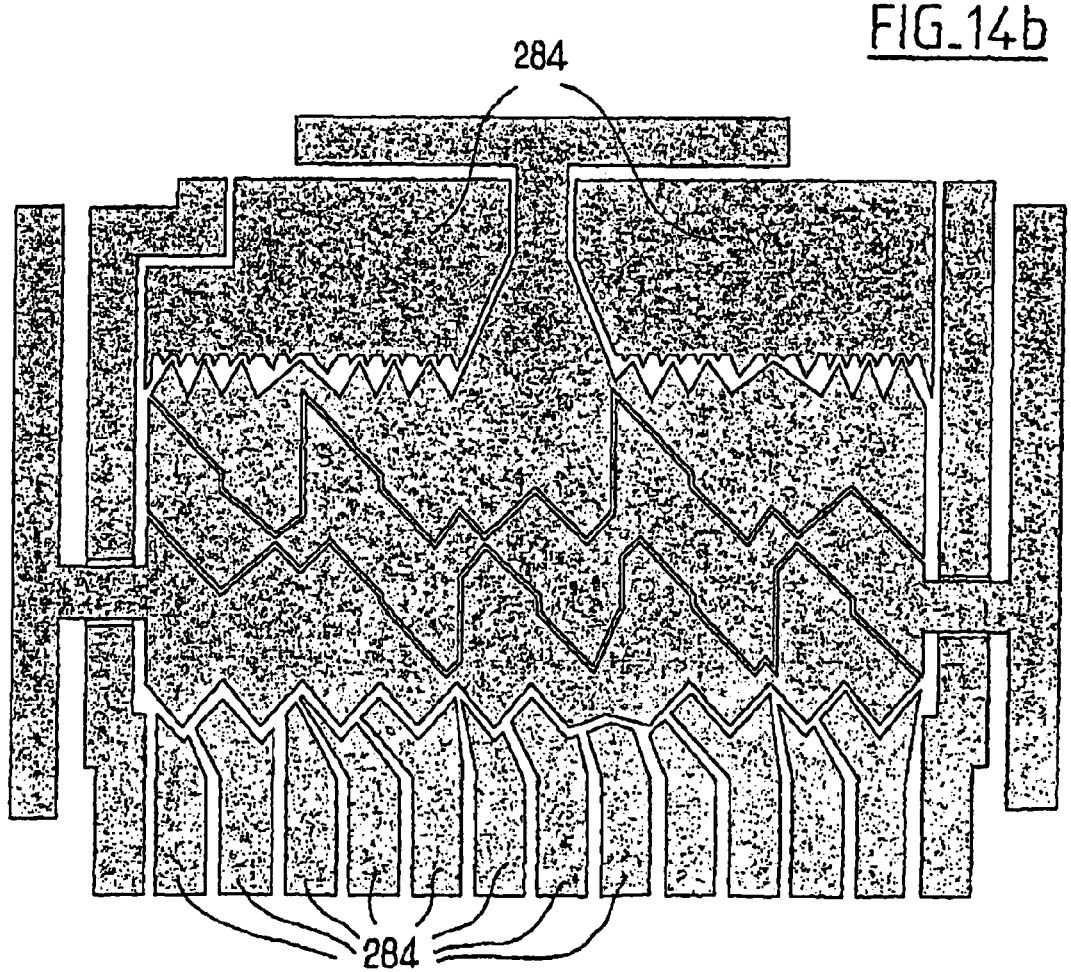

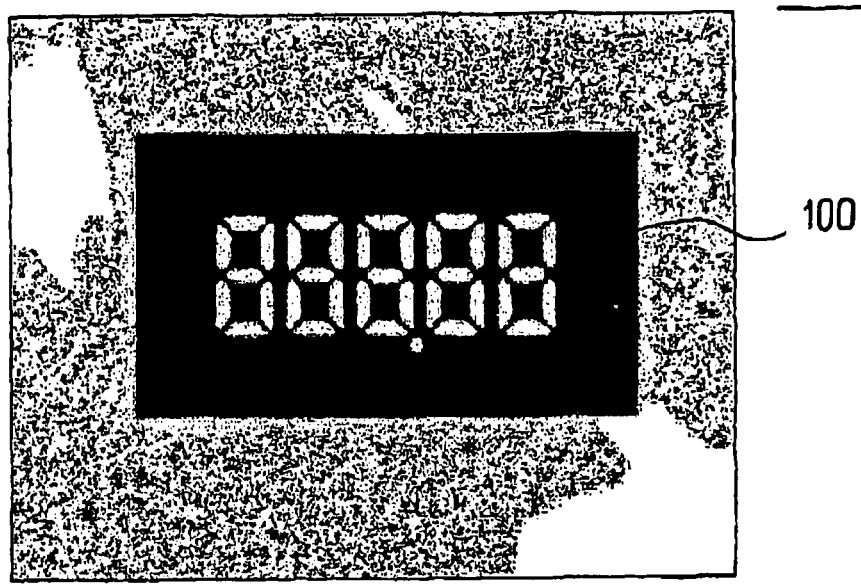
FIG_16
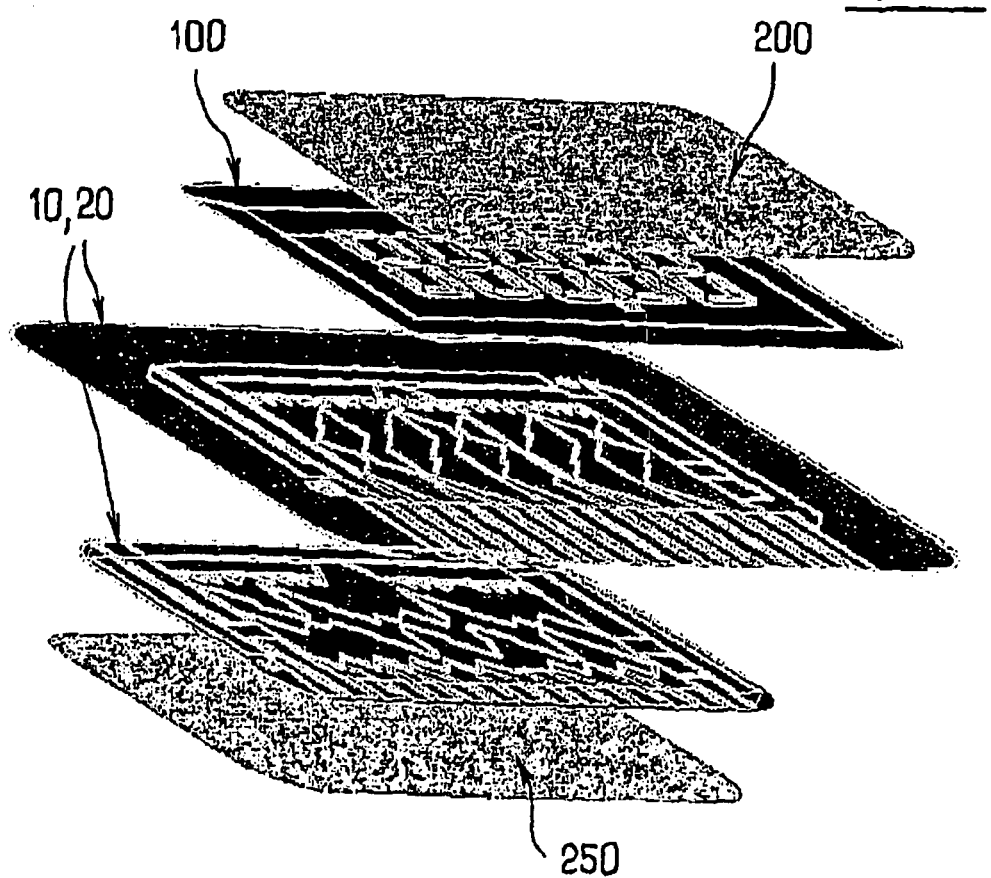
FIG_17

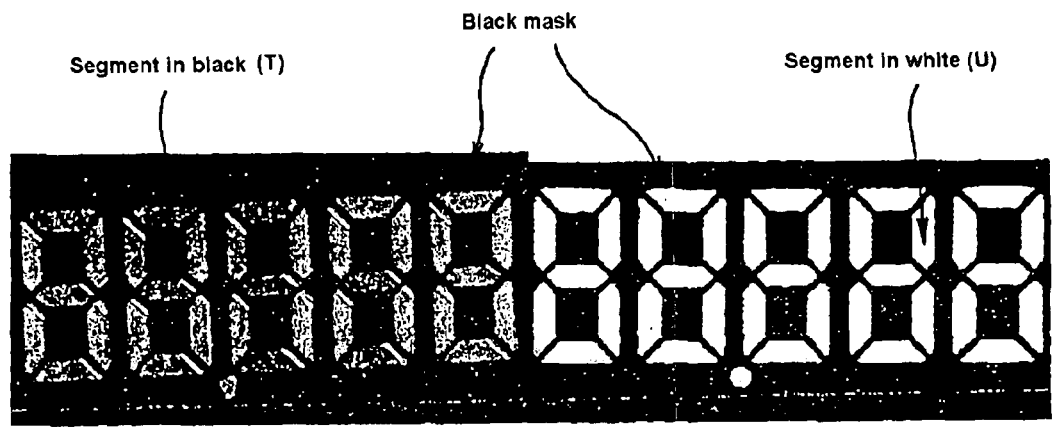
FIG_18a  FIG_18b
FIG_19a
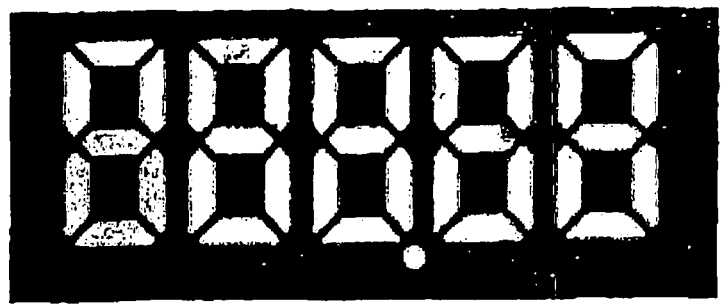
FIG_19b

LIQUID CRYSTAL DISPLAY ENHANCED IN PARTICULAR BY ELIMINATION OF HARMFUL EFFECTS ON THE EDGES OF ADDRESSED ZONES

TECHNICAL AREA

The present invention relates to the area of Liquid Crystal Displays (LCD).

More specifically, the present invention concerns bistable displays with nematic liquid crystals. The present invention finds particular application in bistable displays with nematic liquid crystals having anchor breaking, of which two stable textures differ by a twist angle of approximately 180°.

PURPOSE OF THE INVENTION

The purpose of the invention is to improve the performance of bistable display devices, and more particularly to eliminate some visually harmful effects appearing on the edges of the addressed areas in some known displays.

PRIOR ART LCD TECHNOLOGIES

Standard Prior Art LCD Technology (TN Type)

Functioning Mode of a TN Screen:

This functioning mode will be briefly recalled with reference to FIG. 1 in which two substrates 10, 20 can be seen, provided with respective electrodes 12, 22 between which a layer of liquid crystal molecules 30 is sandwiched.

The TN structure (for Twisted Nematic) is widely used in liquid crystal displays. In these displays, the directions of alignment of the molecules on the two opposite facing substrates 10, 20 (glass or plastic) are perpendicular to each other. The liquid crystal then forms a quarter helix as illustrated on the left of FIG. 1 under reference 31, which illustrates a twisted non-addressed pixel. This represents the stable state of the liquid crystal.

This helical structure causes the direction of polarization of polarized light to be rotated 90°, rectilinear fashion. The liquid crystals used in this effect have positive dielectric anisotropy.

When an electric field E is applied between two electrodes 12, 22, respectively carried by the two substrates 10, 20, the molecules orient themselves parallel to the electric field, i.e. perpendicular to said substrates 10, 20 thereby eliminating the helical structure. This state is unstable, and it is only obtained under an electric field as schematized FIG. 1 under reference 32, in the centre and on the right of FIG. 1, for a pixel thus addressed. The optical axis of the liquid crystal then orients itself parallel to the electric field and light polarization is no longer modified when passing through the liquid crystal.

A cell placed between two crossed polarizers (i.e. between polarizers respectively aligned parallel to the directions of alignment of the liquid crystals on substrates 10, 20) absorbs the light under an electric field (black state) and transmits the light when at rest (white state). This gives black writing against a light background (as illustrated FIG. 2). In this FIG. 2 reference 40 has been given to a non-addressed zone, located between electrodes, and reference 42 to a segment materialized by electrodes.

The reverse is obtained between parallel polarizers, i.e. in this case the cell transmits the light under an electric field (white state) and absorbs the light at rest (black state).

In TN screens, irrespective of addressing mode, the non-addressed zones between the pixels defined by the electrodes used to apply the electric field, are always in quarter-helix twisted state (stable state) as shown FIG. 1 under reference 33.

To conclude, FIG. 1 schematically shows the two textures of a TN screen. The twisted structure is stable. It is found in the zones between the pixels referenced 33 and in the pixels at rest referenced 31. This texture appears as a light color between crossed polarizers. Under an electric field, the molecules lift and orient themselves parallel to the field as illustrated under reference 32. The texture obtained then appears to be black between crossed polarizers.

TN Screens With Digital Display

The addressing mode for a liquid crystal screen can be direct or multiplexed. The structure of the electrodes of a liquid crystal display can have "direct display" or can be a matrix structure.

The simplest addressing mode adapted to a low number of picture elements, is called the direct mode. In this mode, each pixel is addressed independently, and therefore an addressing trace line i.e. the application of a command electric signal, is required per picture element. Usually, the direct addressing mode is used in an electrode structure with direct display in which the two electrodes, respectively provided on the two substrates and between which an electric field is applied, form the image that will be obtained. It is typically used to write a word or acronym. For example, to display a figure or digit consisting of 7 segments (7 elementary units) the electrodes have the shape of the segments and there are 7 trace lines allowing each segment to be connected independently.

When the number of picture elements becomes too high, it becomes technically impossible to provide a connective trace per picture element. In this case, a matrix electrode structure is used with a multiplexed addressing mode.

Multiplexed addressing consists of joining together a certain number of picture elements so as to form rows on one of the substrates and columns on the other substrate. Addressing is then made row-by-row, one row at a time. When addressing a row, the voltages corresponding to the columns are simultaneously injected into all the columns. Addressing then moves on to the following row and so on, as far as the last row.

With matrix displays, the electrodes 12, 22 are arranged in rows and columns respectively on the two substrates 10, 20. Their intersection forms pixels which are "written" (i.e. they are selectively commanded by applying an electric field) in multiplexed mode in order to form an image. The functional diagram of this type of display is given in FIG. 3. In this figure, reference 44 is given to the electrodes of the columns positioned on a first substrate, e.g. the upper substrate, and reference 46 to the row electrodes positioned on the second substrate, e.g. the lower substrate. For example,, to display the pixel of coordinates 3, 4 a row signal is applied to row 4 and a column signal to column 3.

The display mode called digital mode has an electrode structure of direct type and an addressing mode of multiplexed type. It allows the writing of simple elements called segments, forming the digits (most often figures). FIG. 2 shows the TN panel of a calculator with digital display. It consists of 5 figures and one decimal point. The figures are each written by means of 7 segments i.e. a total number of 36 picture elements, addressed in multiplexed mode, which means that some of these segments will be connected together to form the rows and columns. The segments may lie in the black or white state depending on the figure to be displayed. It can be seen in the image FIG. 2 that the segments are well defined, no defect is visible in the non-addressed zones.

FIG. 4 shows the contour of electrodes for digital display with 5 figures (each formed of 7 segments) and a decimal point, i.e. 36 elementary units (5 digits×7 segments=35 segments+decimal point) . The display is multiplexed, i.e. addressing is made matrix fashion: there are 12 "columns" (on a "main electrode"—see FIG. 4a) and 3 "rows" (on the "counter-electrode" see FIG. 4b) making it possible to address 3×12=36 elements. The multiplexing ratio of this display is three. It is therefore possible to address each segment independently by connecting a row and a column along the same principle as in FIG. 3 for the matrix display. For example, to write the decimal point, an electric voltage must be applied between trace p1 in FIG. 4b and trace p10 in FIG. 4a. These traces are also indicated in FIG. 4c.

More precisely, FIG. 4a shows the electrodes (here in the form of 12 columns) provided on a first substrate, e.g. the lower substrate, FIG. 4b shows the electrodes (here in the form of three rows) provided on the second substrate e.g. the upper substrate, while FIG. 4c shows the superimposition of these two types of electrodes. The zones not containing an electrode cannot be addressed. Also more precisely, in FIG. 4c the electrodes illustrated FIG. 4b are shown in dark grey and the electrodes illustrated FIG. 4a are shown in light grey.

State of the Art of So-Called "BiNem" Technology

A new generation of nematic displays, called "bistable" displays, has appeared in recent years: they operate by switching between two stable states if no electric field is applied. Therefore the external electric field is only applied for the time necessary to cause the texture of the liquid crystal to switch from one state to another. If no command electric signal is given, the display remains in the same state. Through its operating principle, this type of display consumes energy that is proportional to the number of image changes. Therefore when the frequency of these changes is reduced, the power needed for functioning of the display tends towards zero. This type of display is undergoing rapid development owing to the expanding market for portable devices.

Operating Mode:

The Binem® bistable display (described in documents FR-A-2 740 893, FR-A-2 740 894 and U.S. Pat. No. 6,327,017 is schematically shown FIG. 5. It shows a display with two substrates 10, 20 provided with respective electrodes 12, 22. FIG. 5, under references 14, 24, illustrates the alignment layers respectively provided on the two substrates 10, 20. Said display uses two textures, a uniform U texture that is slightly twisted (illustrated on the left in FIG. 5) in which the molecules are substantially parallel to each other, and a T texture (illustrated on the right in FIG. 5) which differs from the first by a twist angle of approximately ±180°. The nematic liquid crystal is chiralized so as to have a spontaneous pitch $p_0$ close to four times the thickness d of the cell, to equalize the energies of the two textures. The ratio between cell thickness d and spontaneous pitch $p_0$, i.e. $d/p_0$, is therefore around 0.25±0.1. With no electric field these are minimal energy states: the cell is bistable. Under a strong field a near-homeotropic texture H is obtained. This state is illustrated in the cell centre under reference H. Anchoring of the molecules is broken on at least one of the substrates 10: adjacent molecules lie normal to it. At the end of the pulse command, the cell returns to either one of textures U or T, according to the speed of return to equilibrium of the molecules close to the surface whose anchoring is not broken. A slow return gives the U state by elastic coupling between the molecules close to the two surfaces. A fast return gives the T state by hydrodynamic coupling. Textures U and T are optically different, and a BiNem cell between crossed or parallel polarizers allows modulation of the light between black (blocking state) and white (passing state).

Problems Encountered with BiNem Panels for Digit Display

A first problem encountered in the fabrication of BiNem panels with segments is lack of control over the texture in the non-addressed zones i.e. in the zones located between the electrodes.

Since bi-stability by definition allows two stable states to be obtained (uniform state U and twisted state T), if the two textures after filling or after application of a mechanical constraint on the cell cohabit in a non-addressed zone, then this defect cannot be corrected by applying a electric field since these zones do not have any electrodes. FIG. 6 schematizes this problem.

With matrix panels this phenomenon is observed in the non-addressed zones separating the pixels. It is fairly random and difficult to control, but is little visible due to the small size of the non-addressed areas separating the pixels. In digital display panels, the non-addressed zones (with no electrode) represent the major part of the surface of the display portion (as can be seen FIG. 4). The random coexistence of the two textures in these non-addressed areas is a major visual hindrance.

This effect is shown FIG. 7 in which the two textures lie in non-addressed zones of the effective surface area. In this cell, the differences in texture appeared during the filling phase of the cell by the liquid crystal and can no longer be corrected. FIG. 7 shows a photograph of a BiNem panel in transmissive mode. In this figure the U texture is white and the T texture is black. The non-addressed zones are in fully random states and reading of the figures (here white in U) is difficult.

In FIG. 8a the two textures U and T are mixed at a scale that is non-visible in the non-addressed zones referenced 60, and the visual impression is grayish in these zones.

One solution for the non-addressed zones 60 would be to re-pattern the electrodes (generally consisting of a thin layer of Indium Tin Oxide-ITO) in order to add a trace in the zones located between the effective pixels, so that these zones can be refreshed on each switching. The consequence of this option, however, would be to render the panel complex regarding ITO leads and electronics, leading to largely increased costs. In addition, this does not solve another major problem which is the problem of fringe effects (see following paragraph) and even increases the number of narrow non-addressed zones between the two ITO blocks (called inter-block zones) further aggravating this problem of so-called fringe effects.

A second problem encountered is effectively the presence of fringe effects along the segments. This effect found on all BiNem cells is due to the technology: on the edge of the pixels or segments to be T-addressed, small zones remain in the U state and never switch to T. Therefore U zones can be seen in a segment which should be fully in T. This phenomenon can be attributed to slowing of the hydrodynamic flow of the liquid crystal on the edge of the pixel. At the time of switching, the molecules in the non-addressed zones remain immobile, and the flow of liquid crystal in the pixel is therefore slowed on the edge thereof. On this edge, the hydrodynamic flow is insufficient to cause the liquid crystal molecules to switch to the twisted state T, and elastic coupling consequently returns the liquid crystal to its uniform state U.

On digital display panels with rectangular segments of long length, this defect is much greater than the defect observed in the pixels of matrix panels which are rather more square or scarcely rectangular.

In FIG. 8*b* the fringe effects referenced 70 can be clearly seen along the horizontal segments. When these segments are placed in T-state (black in FIG. 8*b*) the edges remain in U-state (white in FIG. 8*b*) setting up a difference in contrast inside the segment. Their position is always the same in all the cells rubbed in identical manner: the fringe effect appears along the direction perpendicular to the direction of rubbing referenced 72 (cf. FIG. 8*b*). This can be accounted for by the fact that the direction of rubbing coincides with the direction of the hydrodynamic flow which commands switching. It is therefore effectively the edges of the segments perpendicular to the direction of this flow which show a fringe effect.

The fringe effect is more or less pronounced in relation to the parameters of the fabrication method used (rubbing strength, layer hardening . . . ). Rubbing cells at 45° with respect to the directions of the segments reduces the surface area of these fringe effects but they nevertheless remain.

Type of Electrodes Used in Liquid Crystal Displays

Generally the conductor electrodes are made in a transparent conductor called ITO (Indium Tin Oxide) deposited in a thin layer.

But if the display is reflective, the electrodes positioned on the side opposite the viewer do not have a transparency constraint and may be made in an opaque conductive material e.g. aluminum.

In the examples described below, including those within the scope of the invention, an ITO electrode is chosen, but this example is in no way limiting with respect to the constituent material of the electrode.

DESCRIPTION OF THE INVENTION

Principle

The purpose of the present invention is essentially to solve the two above-mentioned shortcomings simultaneously i.e. fringe effects and non-addressed zones, specific to BiNem technology.

This purpose is achieved under the present invention by means of a liquid crystal display device comprising two substrates provided with respective electrodes located either side of a layer of liquid crystal molecules, and means defining two stable states for the liquid crystal molecules, when there is no electric field, characterized in that it also includes a mask comprising transparent areas only leaving visible the pattern of those areas desired to be visualized, and opaque areas covering the remainder of the display surface and inter alia the zones non-addressed by the electrodes, and in that the electrodes are conformed so that their edges are located in zones outside the transparent areas of the mask, and in that on at least one of the substrates the electrodes are formed of blocks, each block consisting of the joining firstly of the elementary areas connected together by multiplexing, and secondly of intermediate zones located underneath the opaque areas of the mask, and in that these blocks cover the entirety of the substrate surface with the exception of intermediate zones of narrow width required for ensuring electric insulation between the blocks.

The inventors therefore propose modifying the conventional method of fabricating liquid crystal display cells by using a mask that only leaves visible the pattern of the segments that are desired to be visualized and by re-designing a new electrode pattern.

Other characteristics, purposes and advantages of the present invention will become apparent on reading the following detailed description with reference to the appended drawings, given as non-limiting examples, in which:

FIG. 1, previously described, schematically shows the two known textures of a TN display, FIG. 2, previously described, is a photograph of a conventional TN digital display, FIG. 3, previously described, is a functional diagram of a matrix display, FIG. 4, previously described, shows the electrodes of a 5-digit 7-segment display; more precisely, FIGS. 4*a* and 4*b* respectively show the patterns of the electrodes provided on the two substrates of the cell, and FIG. 4*c* shows the superimposition of these electrodes;

FIG. 5, previously described, is a functional diagram of a BiNem display;

FIG. 6, previously described, shows the two textures present in a BiNem display;

FIG. 7, previously described, is a photograph of a BiNem display in transmissive mode and illustrates the random state of non-addressed zones;

FIG. 8, previously described, shows other photographs of a BiNem display in transmissive mode; more precisely FIG. 8*a* illustrates grey-shaded non-addressed zones and FIG. 8*b* illustrates harmful fringe effects;

FIG. 9 is a diagram of a display according to the present invention comprising a mask; more precisely FIGS. 9*a* and 9*b* show two positioning variants of the mask conforming to the present invention;

FIGS. 10, 11 and 12 are diagrams showing the different steps of the mechanism which led to the electrode pattern of the invention;

Figure 1:
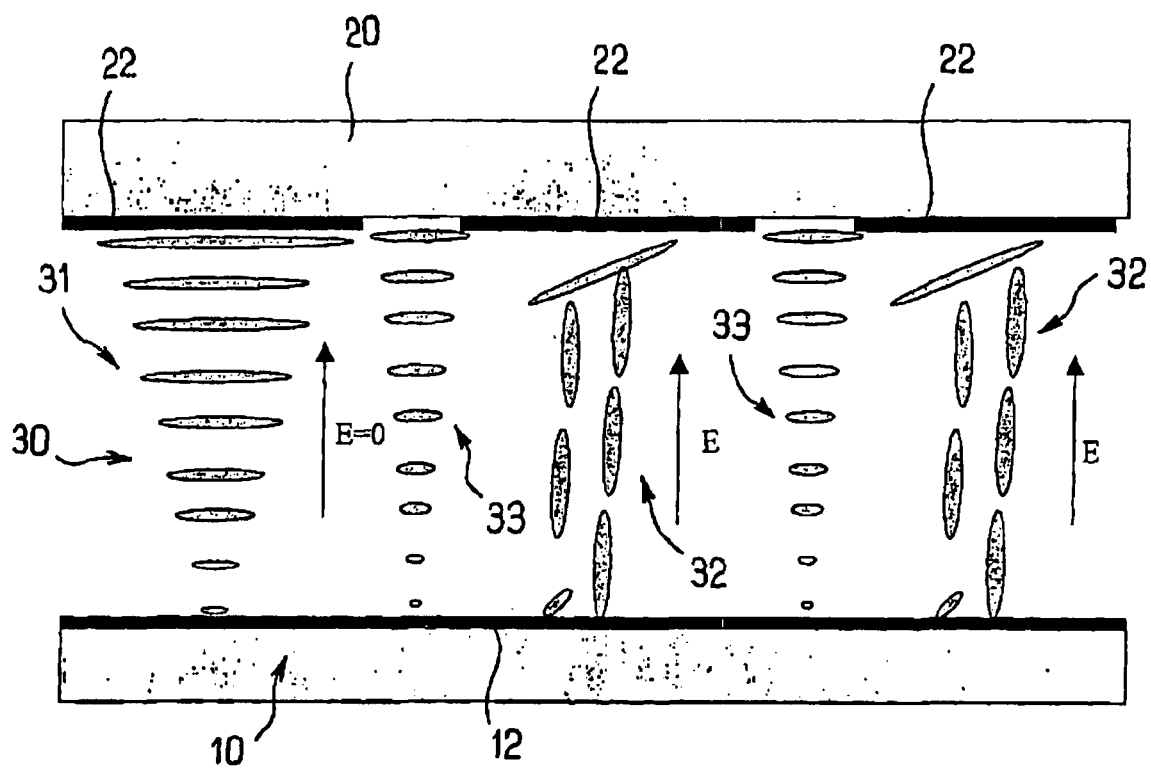
Figure 2:
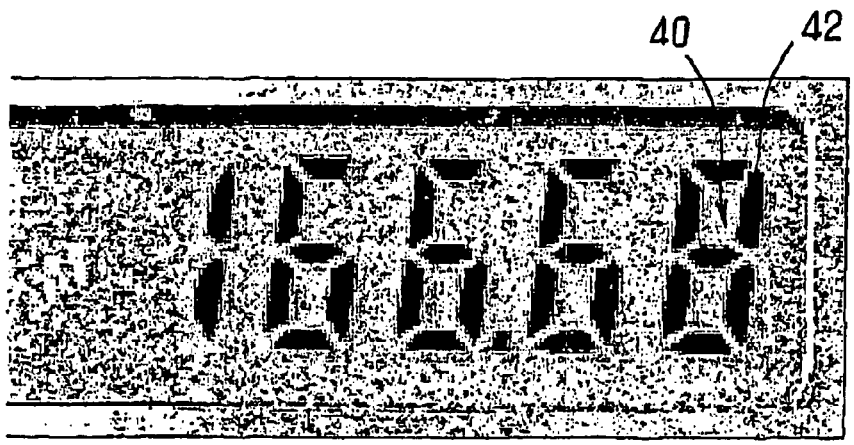
Figure 5:
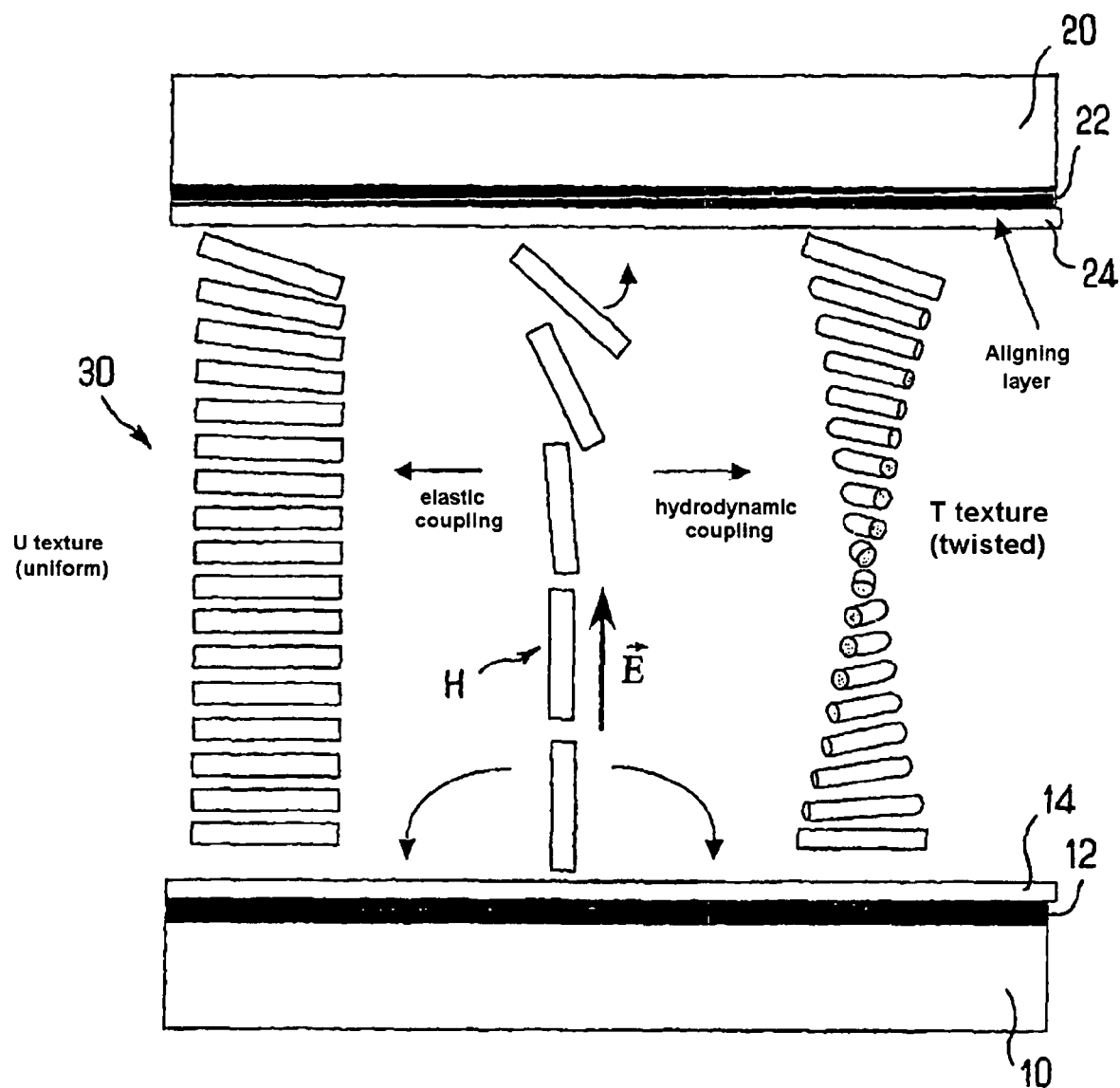
Figure 13A:
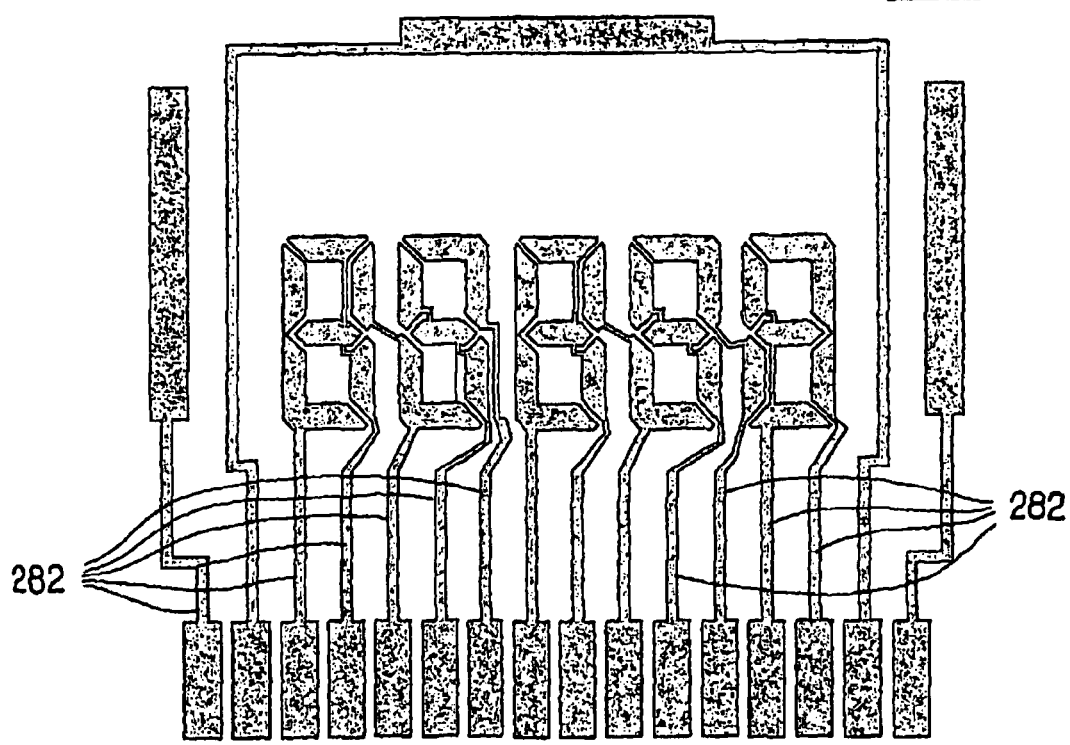
Figure 13B:
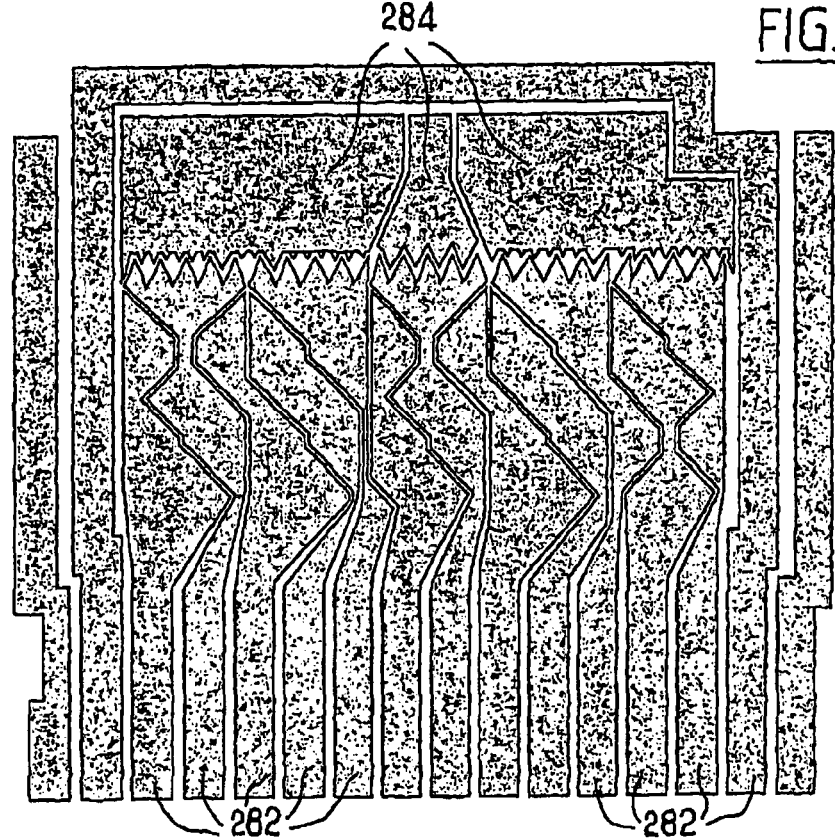
Figure 15A:
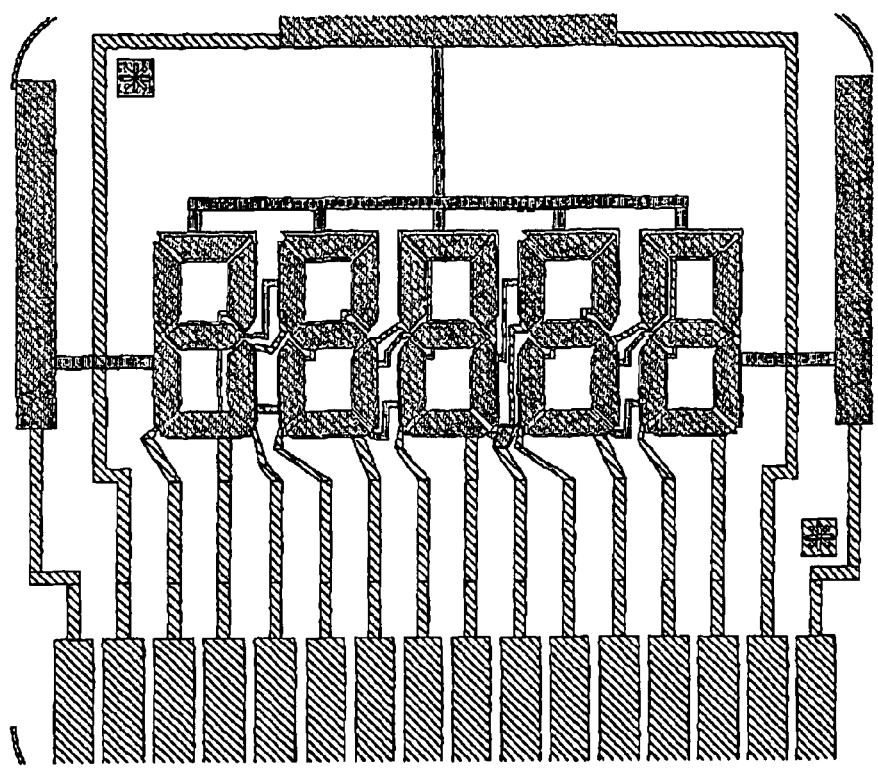
Figure 15B:
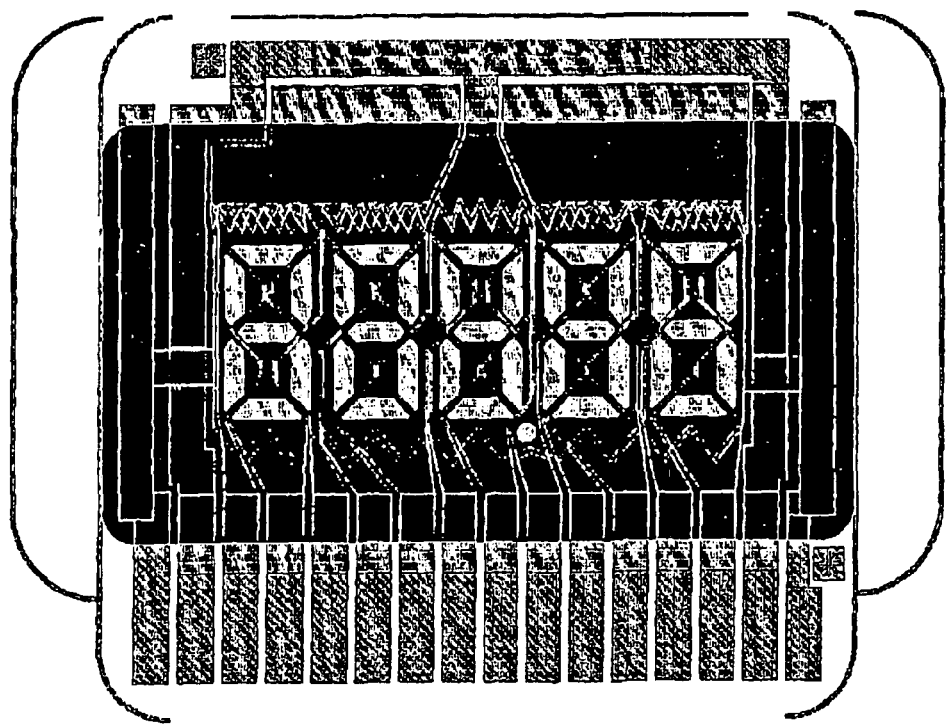

FIG. 13*a* shows the pattern of the main electrodes as in the prior art, while FIG. 13*b* opposite shows the pattern of the main electrodes according to the present invention;

FIG. 14*a* shows the pattern of the counter-electrodes according to the prior art, while FIG. 14*b* opposite shows the pattern of the counter-electrodes according to the invention;

FIG. 15*a* shows the superimposition of electrodes according to the prior art such as illustrated FIGS. 13*a* and 14*a*, while FIG. 15*b* opposite shows the superimposition of the electrodes according to the present invention such as illustrated FIGS. 13*b* and 14*b*, FIG. 16 is a photograph of a mask conforming to the present invention, deposited by serigraphy for example on a substrate or other element of the display;

FIG. 17 is an exploded, perspective view illustrating the superimposition of the elements forming a display conforming to the present invention, with incorporated mask;

FIG. 18 shows a digital BiNem display conforming to the present invention with black mask and in transmissive mode, respectively in the non-passing state (black=T-state) in FIG. 18*a* and the passing state (white=U-state) in FIG. 18*b*, in the presence of a slight misalignment which can be seen FIG. 18*a*; and FIG. 19 shows another view of a digital BiNem display conforming to the present invention with black mask and in transmissive mode, respectively in the non-passing state (T-state) in FIG. 19*a*, and the passing state (U-state) in FIG. 19*b*, with no misalignment.

The characteristics of the present invention will be described in greater detail below with reference to appended FIGS. 9 to 19.

As indicated previously, and as can be seen in appended FIG. 9, under the present invention the display device comprises an opaque or near-opaque mask 100. This mask 100 comprises transparent areas 120 only leaving visible the pattern of the segments it is desired to visualize, and opaque or near-opaque areas 110 covering the remainder of the surface.

The mask 100 may be made in any suitable material.

It may also be deposited at any suitable point of the display.

The mask 100 can therefore be made on the cell itself or even outside the cell, on the viewer side or on the opposite side (e.g. between the substrate 20 and a polarizer 200 placed on the viewer side as illustrated FIG. 9a, or ahead of the polarizer 200 on the viewer side i.e. between the polarizer 200 and the viewer as illustrated FIG. 9b).

The rear polarizer 250 can be either of transmissive type, for a transmissive display, or of reflective type for a reflective display, or of transflective type for a transflective display.

For a cell of transmissive type, the mask 100 may be positioned on the lighting side or the viewer side.

For a reflective panel (having a reflector outside or inside the cell) the mask 100 is preferably positioned on the viewer side i.e. on the top side of the panel.

It is also possible to consider integrating the mask 100 inside the display, on the viewer side or the opposite side.

In all cases, the mask 100 is preferably aligned with the patterns of the electrodes to within less than 50 µm.

The mask 100 covers all the surface with the exception of the areas it is desired to visualize, and therefore solves the first above-cited problem i.e. irrespective of the actual state of the liquid crystal in the zones located under the opaque areas of the mask 100, at this level the appearance of the display is always the appearance of the mask. Nonetheless, fringe effects may remain visible.

However, the presence of the mask 100 releases the electrode pattern from a certain number of constraints, this pattern no longer needing to correspond exactly to the shape, here the segment, that it is desired to visualize. The electrodes can therefore be fully re-designed according to the present invention. With the novel pattern of the invention, the edges of the electrode segments 22 come to lie in zones outside the transparent areas 120 of the mask, underneath the opaque or near-opaque areas 110 of the mask. The previously described fringe effects are therefore made invisible by the mask 100.

Additionally, the non-addressed zones can be suppressed by forming blocks of electrodes (in ITO for example) from the rows and columns.

The presence of a mask 100 in a BiNem display also offers the opportunity of optimising the contrast of the display. It can be chosen to display white digits against a black background, in which case the mask 100 is black. Or it can be chosen to display digits in black against a white background. In this case the mask 100 is "white".

The mask 100 can in fact be neither perfectly black nor perfectly white. It may have a hue which is as close as possible to the state of the digits. If black digits are displayed against a light background, the hue of the mask 100 must be as close as possible to the color of the digits when they are bright, or conversely if a white display against a dark background is chosen the hue of the mask 100 must be as close as possible to the dark state of the digits.

Contour of the Electrodes

The approach taken by the inventors is now described, which led them to re-designing the geometry of the electrodes 22.

Reduced Fringe Effects Visible to the Viewer:

The mask 100 which only leaves digits and the decimal point visible (such as shown FIG. 16 for example) is used to cover the zones that are non-addressed according to the prior art pattern. But its existence can be used to completely modify the pattern of the electrodes 22 as compared with conventional geometry, for the purpose of also masking the fringe effects described above.

The fringe effects are highly pronounced when rubbing is perpendicular to the pattern of the electrodes. They may extend over 0.5 mm on certain displays like the one in FIG. 8.

To hide the fringe effects, several steps to re-design the pattern of the electrodes were necessary.

A first step, illustrated FIG. 10, consisted of widening the electrode segments while maintaining their initial shape. More precisely, FIG. 10a shows the conventional electrode pattern (indicating the direction of rubbing 72 and the fringe effects 70), while FIG. 10b shows a draft pattern under the present invention. In FIGS. 10b and 11, the dashed lines 74 delimit the contours of the segments it is desired to visualize, corresponding to the contours of the prior art electrodes (FIG. 10a). FIG. 10b however shows that some fringe effects, whose size cannot be controlled, remain visible. These effects appear inside some parts of the delimitation 74 in dashed lines illustrated FIG. 10b.

To minimize the size of the fringe effect, the inventors determined that it is desirable for the electrode pattern to lie at all times at a minimum angle of 45° to the direction of rubbing, and hence to the roller of the rubbing machine.

FIG. 11 therefore shows the theoretical pattern that this second modification would lead to. In FIG. 11 the edges of the electrodes are no longer perpendicular to the direction of rubbing. The fringe effects 70 are localized at the triangle corners. They are no longer apparent through the mask 100. In this configuration the fringe effect 70 is not only smaller but it is also drawn back into a zone hidden by the mask 100. The fringe effects 70 that can be seen in FIG. 11 effectively lie outside the transparent areas 75 located inside the delimitations 74.

In practice, it is fairly difficult however to widen the electrode segments in the manner shown FIG. 11. Nevertheless, starting from this theoretical pattern the inventors arrived at a third and final step in re-designing the electrodes, as illustrated FIG. 12.

More precisely FIG. 12a shows the conventional electrode pattern (on one of the substrates) conforming to the prior art (here the column pattern), FIG. 12b shows an electrode delimitation conforming to the present invention illustrated in superimposition over the conventional pattern in FIG. 12a, and FIG. 12c shows the final electrode pattern conforming to an embodiment of the present invention.

As can be seen FIGS. 12b and 12c the inventors recommend creating electrode blocks 28 from original segments 22 connected together by multiplexing, and to widen these blocks well beyond the zone to be visualized. Since the opaque mask has removed all constraints regarding the shape of the electrode, the size of these blocks can be increased until they practically join up, separated solely by an interblock zone 281 of narrow width, typically 2 to 100 µm, preferably 5 to 50 µm.

As can be seen in the appended figures, e.g. FIGS. 12c, 13b and 14b, under the present invention the adjacent, almost joining electrode blocks 28 can be delimited by contours consisting of preferably rectilinear sections parallel to each other. The interblock zone is then delimited on one of its dimensions by two rectilinear sections parallel to each other separated by a distance of typically 2 to 100 µm, preferably 5 to 50 µm.

The final pattern obtained illustrated FIG. 12c is far removed from the initial pattern in FIG. 12a.

Since the surface of the blocks has been enlarged compared with the prior art, this surface is therefore significantly less resistive than three conventional segments 22 connected by two narrow traces 23.

To summarize, FIGS. 12a, 12b and 12c show the progress from the original pattern to the final pattern due to multiplexing and use of the mask. It can be seen FIG. 12a that the segments 22 of a digit are connected together by thin traces 23. As the multiplexing ratio is three in this pattern, the segments 22 of the electrodes are connected in threes as explained previously. FIG. 12b shows the superimposition of the original pattern (almost equivalent to the mask pattern) and of the final pattern of the digit in which three electrode blocks 28 have been created, in ITO for example, consisting of joining together firstly the elementary areas or segments joined by multiplexing, and secondly the intermediate zones which, in the prior art pattern, formed non-addressed zones between the segments. Finally, FIG. 12c shows that in the final pattern the ITO surface is much larger than in the conventional pattern. There are no longer any non-addressed zones, making it possible to achieve total refreshing of the display surface including the areas it is desired to visualize. The fringe effects 70 are pulled back into the corners of the pattern which are far distant from the area visible by the viewer.

In FIGS. 12b and 12c, on the upper ridge of the ITO block referenced 280, the principle of the angle of 45° to the direction of rubbing 72 is maintained no longer in the form of a single tip but in the form of several saw-teeth, in order to reduce the surface of the electrode and hence to reduce the risks of short circuiting.

In addition, as can be seen FIG. 12b, it is possible to reduce the width of the interblock zone 281 compared with the initial width between two segments of the pattern according to the prior art, in order to facilitate alignment between the mask patterns and the electrode.

This new electrode pattern according to the invention also applies to the opposite facing substrate, here the substrate comprising the row electrodes.

Advantages of the Novel Electrode Pattern According to the Present Invention

The final electrode pattern illustrated FIG. 12c shows several advantages, in addition to the advantage of drawing the fringe effects 70 outside of the zone visible by the viewer.

One first advantage is the simplification of the trace pattern, leading to increased fabrication yield.

A second advantage is the facilitated alignment between the mask pattern and the electrode pattern. In the electrode pattern of the invention, there are no longer any non-addressed zones and the width of the interblock zone can be reduced as compared with the prior art, while the width of the mask 100 can be slightly increased. Since the entire ITO blocks 28 are addressed, there is no longer any limitation constraint regarding the shape of the segments 22 to align the mask 100 on the ITO electrodes (or conversely to align lithography on the mask 100). Limitation regarding alignment therefore only derives from the interblock zone 281. For its facilitation, the inventors brought the following, previously mentioned, modifications:

the interpixel on the mask 100 is widened,
the interblock zone 281 is thinned, and
the initial decimal point has become a dot.

A third advantage is that, owing to the increase in the surface of each electrode block, its global resistance is reduced. Similarly, the connect traces 282 in FIG. 13a according to the prior art have been widened in FIG. 13b according to the invention.

A fourth advantage is that the effective area is practically solid ITO, guaranteeing very good homogeneity of the thickness of the liquid crystal cell. Said homogeneity facilitates filling of the cells. To further improve homogeneity, blocks that are not electrically connected and denoted 284 in FIGS. 13b and 14b can be added on the outside of the effective area. These blocks 284 have the same thickness as the active electrodes. They are preferably made in the same material as these active electrodes i.e. in ITO. Preferably the distance separating these ITO blocks 284 from each other, and separating them from the electrodes 28, ranges from 1 to 500 µm, most preferably from 5 to 50 µm.

In the original pattern, the filling front is not at all regular. The liquid crystal firstly fills the thinnest zones i.e. the opposite facing zones with ITO, and then the zones without ITO. Therefore it is the segments which are filled firstly and then the inside of the digits and bottom part of the cell. It regularly occurs that this non-uniform filling leaves small bubbles in these zones. These bubbles are visually displeasing and can move under pressure on the cell.

On the contrary, the good homogeneity of cell thickness according to the present invention affords more uniform filling, which limits the number of bubbles.

EXAMPLES OF EMBODIMENT OF THE INVENTION 5-digit, 7-segment displays were produced according to the invention.

In FIGS. 13, 14 and 15 an example of an ITO pattern according to the invention can be seen on each complete electrode. According to this example, 12 ITO blocks are created corresponding to the twelve columns of the electrode (FIG. 13b) and 3 ITO blocks on the counter-electrode corresponding to the three rows (FIG. 14b). The final pattern obtained is illustrated FIG. 15b. It is far removed from the original conventional pattern illustrated FIG. 15a. This new pattern has a practically solid electrode.

As a complement to the redesigning of the electrodes, a mask 100 of the invention has been implanted in a display. In this embodiment the solution adopted by the inventors was to apply a dark-colored ink, by serigraphy, to the upper substrate 20 previously lithographed. FIG. 15b shows the superimposition of the two electrodes according to the invention (FIGS. 13b and 14b), of the display and of the mask 100.

FIG. 16 shows the result of depositing a black ink on a lithographed substrate. In this non-limiting example the mask is placed between the top substrate 20 and the polarizer 200, as shown FIG. 17. With this mask coloring, after panel fabrication, the display is white against a black background.

Examples of displays made with the electrode pattern 28 and the mask 100 of the invention are shown FIGS. 18 and 19. In these displays white digits are displayed against a black background. In the display FIG. 18, the non-addressed zones and the fringe effects are no longer apparent. However the color of the mask is not yet quite the color of the digits in black, and the mask is not perfectly aligned with the electrode pattern: therefore interblock zones 281 can still be seen in the white state. In the display shown FIG. 19, the color of the mask is perfectly adapted to the color of the digits and it is perfectly aligned.

Evidently the present invention is not limited to the particular embodiments just described, but extends to all variants conforming to its spirit.

The invention claimed is:

1. Liquid crystal display device operating with a multiplexed addressing, comprising two substrates (10, 20) provided with respective electrodes and located on either side of a layer of liquid crystal molecules (30), said electrodes forming rows on one of said substrates and forming columns on the other substrate, and means comprising an alignment layer having a rubbing direction, defining two stable states for the liquid crystal molecules when there is no electric field, characterized in that it also includes a mask (100) comprising transparent areas (120) only leaving visible the pattern of the areas it is wished to visualize, and opaque areas (110) covering the remainder of the surface of the display inter alia the zones non-addressed by said electrodes (12, 22), and in that said electrodes (12, 22) are conformed so that their edges are located in zones outside the transparent areas (120) of the mask (100), in that on at least one of the substrates (10, 20) said electrodes are formed of blocks (28), in that each electrode block (28) consists of firstly elementary areas of the electrodes which are provided outside the opaque areas of the mask, and secondly intermediate zones located underneath the opaque areas (110) of the mask (100), said elementary areas of the electrodes and said intermediate zones of the electrodes being connected together, and in that the blocks cover the entirety of the substrate surface with the exception of interblock zones (281) of narrow width necessary to ensure electric insulation between the blocks, wherein the pattern of certain edges of the electrode blocks forms and angle in the order of 45° with the direction of rubbing, and at least one edge of an electrode is of "saw-tooth" type comprising elementary sections substantially oriented at 45° to the direction of rubbing.

2. Device according to claim 1, characterized in that on at least one of the substrates (10, 20) it comprises means for anchoring the liquid crystal molecules, which allow anchor breaking when a suitable electric field is applied between electrodes respectively provided on the substrates (10, 20).

3. Device according to claim 1, characterized in that it uses two textures of liquid crystal molecules whose twist angle differs in the order of ±180°.

4. Device according to claim 1, characterized in that it uses two textures of liquid crystal molecules, one uniform or scarcely twisted in which the molecules are at least substantially parallel to each other, and the other which differs from the first by a twist angle of approximately 180°.

5. Device according to claim 1, characterized in that the ratio between the thickness d of the cell and the spontaneous pitch $p_0$ of the liquid crystal molecules is approximately 0.25±0.1.

6. Device according to claim 1, characterized in that the mask (100) is placed on the viewer side.

7. Device according to claim 1, characterized in that the mask (100) is placed between the substrate (20) and a polarizer (200) positioned on the viewer side.

8. Device according to any of claims 1 to 6, characterized in that the mask (100) is placed ahead of a polarizer (200) on the viewer side i.e. between the polarizer (200) and the viewer.

9. Device according to any of claims 1 to 5, characterized in that the mask (100) is placed on the side opposite the viewer.

10. Device according to any of claims 1 to 9, characterized in that the mask (100) is integrated inside the display.

11. Device according to claim 1, characterized in that it is of transmissive type and that the mask (100) is placed on the lighting side.

12. Device according to claim 1, characterized in that it is of reflective type and that the mask (100) is placed on the viewer side.

13. Device according to claim 1, characterized in that the mask (100) is aligned with the patterns of the electrodes, to within less than 50 μm.

14. Device according to claim 1, characterized in that the mask (100) has a hue which is close to one of the states of the visual areas or segments defined by the liquid crystal.

15. Device according to claim 1, characterized in that it is designed to display black segments against a light background, and in that the hue of the mask (100) is close to the color of the segments when they are bright.

16. Device according to claim 1, characterized in that it is designed to display light segments against a dark background, and in that the hue of the mask (100) is close to the color of the segments when they are dark.

17. Device according to claim 1, characterized in that the adjacent electrode blocks (28) are delimited by contours consisting of preferably rectilinear sections, parallel to each other.

18. Device according to claim 1, characterized in that on each of the two substrates (10, 20) the electrodes are formed of blocks (28) which cover the entirety of the substrate surface with the exception of intermediate zones (281) of narrow width necessary to ensure electric insulation between the blocks.

19. Device according to claim 1, characterized in that the adjacent electrode blocks (28) are separated by a distance typically lying between 2 to 100 μm, preferably 5 to 50 μm.

20. Device according to claim 1, characterized in that it comprises additional blocks (284) having the same thickness as the electrodes (28) and preferably consisting of the same material as the electrodes (28), but which do not take part in the display of data to guarantee the homogeneity of cell thickness.

21. Device according to claim 20, characterized in that the distance which separates the additional blocks (284) from each other and which separates them from the electrodes (28) ranges from 2 to 500 μm, most preferably from 5 to 50 μm.

22. Device according to claim 1, characterized in that the electrode blocks (28) are in ITO on at least one of the substrates (10, 20).

23. Device according to claim 1, characterized in that the electrode blocks (28) are in ITO on both substrates (10, 20).

* * * * *

UNITED STATES PATENT AND TRADEMARK OFFICE
CERTIFICATE OF CORRECTION

PATENT NO. : 7,812,903 B2  
APPLICATION NO. : 11/660342  
DATED : October 12, 2010  
INVENTOR(S) : Cécile Barron et al.

It is certified that error appears in the above-identified patent and that said Letters Patent is hereby corrected as shown below:

In the Claims, Column 11, Claim 1, line 22, please delete "forms and" and insert --forms an--.

Signed and Sealed this  
Seventh Day of May, 2013

Teresa Stanek Rea  
*Acting Director of the United States Patent and Trademark Office*